United States Patent [19]
McConnell

[11] Patent Number: 5,410,899
[45] Date of Patent: May 2, 1995

[54] RETAINER CLIP FOR ESCUTCHEON ASSEMBLY

[75] Inventor: Kenneth L. McConnell, New Hampton, Iowa

[73] Assignee: Tri/Mark Corporation, New Hampton, Iowa

[21] Appl. No.: 52,246

[22] Filed: Apr. 22, 1993

[51] Int. Cl.[6] ............................................. E05B 9/08
[52] U.S. Cl. .................................. 70/370; 70/451; 403/257
[58] Field of Search .............. 70/452, 451, 370, 371, 70/466, DIG. 40, 224; 403/254, 257; 248/27.1, 27.3

[56] References Cited

U.S. PATENT DOCUMENTS

| | | | |
|---|---|---|---|
| 1,207,465 | 12/1916 | Augenbraun | 70/370 |
| 2,040,258 | 5/1936 | Jacobi | 70/370 |
| 2,487,803 | 11/1949 | Heimann | 70/370 |
| 2,506,642 | 5/1950 | Jacobi | 70/370 |
| 2,610,500 | 9/1952 | Poupitch | 70/370 |
| 2,744,185 | 5/1956 | Cawley | 70/370 |
| 2,948,141 | 8/1960 | Vahlstrom | 70/370 |
| 3,452,564 | 7/1969 | Hallgren | 70/451 |
| 3,868,836 | 3/1975 | La Roche | 70/370 X |
| 4,492,101 | 1/1985 | Tanaka | 70/370 |
| 4,873,852 | 10/1989 | Neyret | 70/370 X |

FOREIGN PATENT DOCUMENTS

| | | | |
|---|---|---|---|
| 67305 | 7/1948 | Denmark | 70/370 |
| 0204605 | 12/1986 | European Pat. Off. | 70/370 |
| 0390669 | 10/1990 | European Pat. Off. | 70/370 |
| 2360727 | 4/1978 | France | 70/451 |
| 828496 | 1/1952 | Germany | 70/370 |
| 1218041 | 1/1971 | United Kingdom | 70/370 |

*Primary Examiner*—Lloyd A. Gall
*Attorney, Agent, or Firm*—Wood, Phillips, VanSanten, Clark & Mortimer

[57] ABSTRACT

A lock unit with an escutcheon assembly to be mounted on a movable closure and a retainer clip to maintain the escutcheon assembly in an operative position on the movable closure. The escutcheon assembly defines a first shoulder. The clip has a biasing portion defining a second shoulder for bearing on the first escutcheon assembly shoulder and a third shoulder for bearing on a surface of a movable closure on which the escutcheon assembly is mounted with the escutcheon assembly in its operative position and the retainer clip and escutcheon assembly in assembled relationship. The biasing portion of the retainer clip is in compression between the second and third shoulders to positively maintain the escutcheon assembly in its operative position.

8 Claims, 2 Drawing Sheets

RETAINER CLIP FOR ESCUTCHEON ASSEMBLY

BACKGROUND OF THE INVENTION

1. Field of the Invention

This invention relates to locks of the type commonly used on closure members such as entry doors, lids on storage containers, and the like, and, more particularly, to a lock having an escutcheon assembly which can be maintained in an operative position on a closure member by a press fit retainer clip.

2. Background Art

Various types of closure members have mounted thereto a lock with an escutcheon assembly that carries a plunger. The plunger is engageable with a strike element mounted to a frame relative to which the closure member is supported for movement between open and closed positions. The plunger has a shoulder which engages behind a wall on the strike element to maintain the closure member in its closed state.

The above type of mechanism is commonly used on travel trailer and motor home doors, and the like, made from aluminum stock with an extruded frame. Heretofore, securing of the escutcheon assembly to the closure member has presented a problem to those in the art.

One known way of connecting the escutcheon assembly to the closure member requires that a recess be provided on the inside surface of the closure member to accommodate a fastening element. This element may be a nut that is threaded over the peripheral surface of the body of the escutcheon assembly. An enlarged operating end on a cylinder that rotates within the escutcheon assembly defines a shoulder which, in conjunction with the nut, captively holds the thickness of the closure member.

The above structure has several drawbacks. First of all, the threaded connection between the nut and the escutcheon assembly requires threading a substantial portion of the outer surface of the escutcheon assembly. This modification to the escutcheon assembly increases manufacturing costs.

Additionally, the assembler is required to thread the nut over the escutcheon assembly until the desired torque is achieved. Because the nut is in a recess, it may be difficult to access during assembly.

Additionally, it is very difficult to consistently tighten the nuts with the desired torque and precisely maintain the orientation of the lock relative to the closure member. As the nut is tightened, there is a tendency of the lock to rotate about its axis.

SUMMARY OF THE INVENTION

The present invention is specifically directed to overcoming the above enumerated problems in a novel and simple manner.

More particularly, the present invention has as one of its principal objectives the provision of retention structure for an escutcheon assembly on a lock that positively and consistently holds the escutcheon assembly in its operative position while affording ease of assembly.

More particularly, according to the invention, a lock unit has an escutcheon assembly to be mounted on a movable closure and a retainer clip to maintain the escutcheon assembly in an operative position on the movable closure. The escutcheon assembly defines a first shoulder. The clip has a biasing portion defining a second shoulder for bearing on the first escutcheon assembly shoulder and a third shoulder for bearing on a surface of a movable closure on which the escutcheon assembly is mounted with the escutcheon assembly in its operative position and the retainer clip and escutcheon assembly in assembled relationship. The biasing portion of the retainer clip is in compression between the second and third shoulders to positively maintain the escutcheon assembly in its operative position.

The escutcheon assembly defines an axis. The retainer clip is constructed to cooperate with a closure member on which it is mounted to limit rotation of the escutcheon assembly about its axis.

In one form, the retainer clip has a U-shaped configuration with a base and first and second legs that straddle the escutcheon assembly with the retainer clip and escutcheon assembly in assembled relationship. One of the legs has a V-shaped bend therein with an apex defining the second shoulder. The one leg has first and second parts extending away from the apex and defining the V shape, with one of the first and second parts defining the third shoulder.

In one form, the retainer clip has a wall with a surface residing in a plane substantially at right angles to the length of the first and second legs to abut a closure member to limit rotation of the escutcheon assembly relative thereto.

In one form, the retainer clip is defined as a single piece, that is preferably metal. The retainer clip may be formed out of a single sheet metal blank.

In one form, the retainer clip has a tab at the base thereof to facilitate prying of the retainer clip out of its assembled relationship with the escutcheon assembly.

In one form, the legs of the retainer clip are each V-shaped, with the base of the retainer clip having a U-shaped portion opening in the same direction as the V-shaped first and second legs. The U-shaped portion is defined by third and fourth legs, with the third leg connecting to one of the first and second legs and the fourth leg having a wall defining a surface to bear against the part of the movable closure.

In a preferred form, the retainer clip is assembled to the escutcheon assembly by simply being pressed against the escutcheon assembly in an assembly direction. This obviates the need for a recess to accommodate a nut, or the like, and avoids time consuming and delicate assembly steps.

The invention is further directed to a combination including a closure to be mounted on a frame for movement between open and closed positions, an escutcheon assembly mounted on the closure in an operative position and having an element thereon to engage a strike element on a frame to which the escutcheon assembly is attached to maintain the movable closure in a closed position, and a retainer clip to maintain the escutcheon assembly in its operative position on the closure member with the retainer clip in assembled relationship to the escutcheon assembly. The escutcheon assembly, retainer clip and closure member cooperate to allow the retainer clip to be press fit into assembled relationship with the escutcheon assembly and maintain the escutcheon assembly in its operative position.

The closure member, retainer clip, and escutcheon assembly also cooperate to limit rotation of the escutcheon assembly about its axis. To limit rotation of the escutcheon assembly, the closure member has transverse surfaces to engage the retainer clip at spaced locations thereon. These transverse surfaces may be defined at a corner of a frame on the closure member.

In one form, the closure member has a third surface facing in a first direction. There are diametrically oppositely shoulders on the escutcheon assembly facing oppositely to the first direction, and a biasing portion on the retainer clip is compressed between the third surface and each of the shoulders on the escutcheon assembly.

DETAILED DESCRIPTION OF THE DRAWINGS

Figure 6:
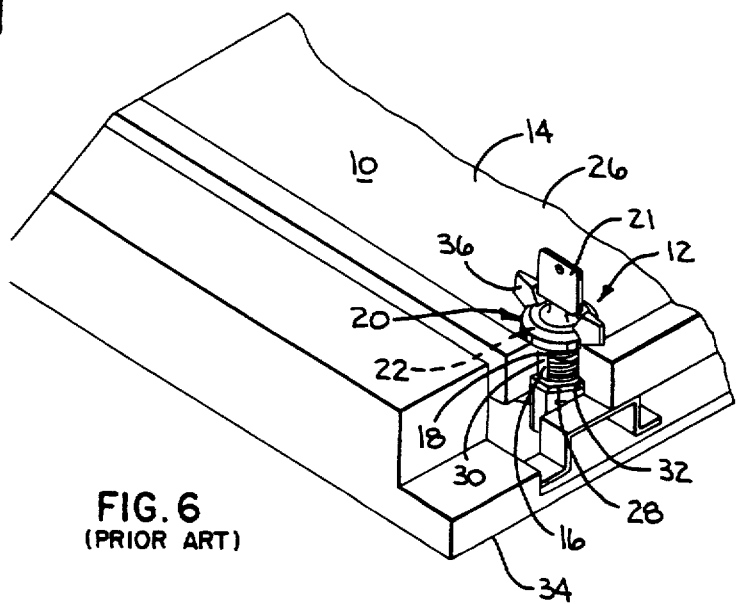
FIG. 6 is a fragmentary, perspective view of a closure member with a lock mounted thereon in conventional fashion.

In FIG. 6, a closure member 10 is shown with a lock at 12 mounted thereon in conventional fashion. The closure member 10 has a wall 14 through which the lock 12 extends. More particularly, the lock 12 has an escutcheon member 16 with a generally cylindrical outer surface that is received by a through bore 18 in the wall 14. A key operated cylinder assembly at 20 is rotatable through a key 21 to operate the lock 12. The escutcheon member 16 has an enlarged annular rim 22 that bears on the outside surface 26 of the closure member 10. A nut 28 is threaded over the peripheral surface 30 of the escutcheon member 16 and bears on an undercut annular shoulder 32 on the closure member 10 to captively hold the wall in conjunction with the escutcheon member rim 22.

The need to undercut the inside surface 34 of the closure member 10 complicates the manufacture thereof. Additionally, the nut 28 must be manipulated within the limited space afforded by the undercut. Still further, tightening of the nut 28 to a consistent torque is difficult to accomplish. Even then, there is a tendency of the escutcheon member 16 to rotate within the bore 18 which may result in improper alignment of the exposed portion 36 of the cylinder assembly 20.

The present invention, as seen in FIGS. 1–5, obviates the above problems. The present invention is directed to maintaining a lock at 40 in an operative position on a closure member 42. The closure member 42 can be, for example, a door on a motor home, a lid on a tool box, or the like. The precise type of closure member is irrelevant, but typically such a closure member 42 is pivotable between closed and open positions therefor. With the closure member 42 closed, a movable plunger 44 thereon engages a strike element, shown schematically at 46, which in turn is mounted on a frame, shown schematically at 48, relative to which the closure member 42 is movable.

Figure 1:
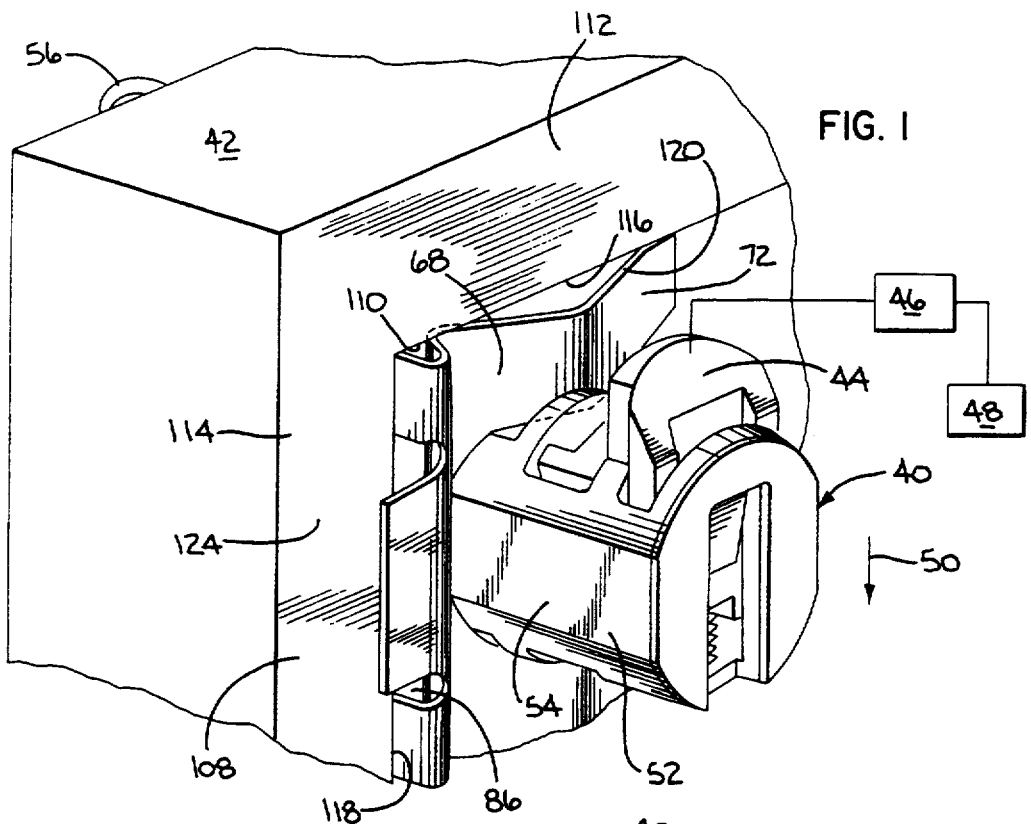
FIG. 1 is a fragmentary, rear perspective view of a closure member with a lock mounted hereon using a retainer clip according to the present invention.
Figure 2:
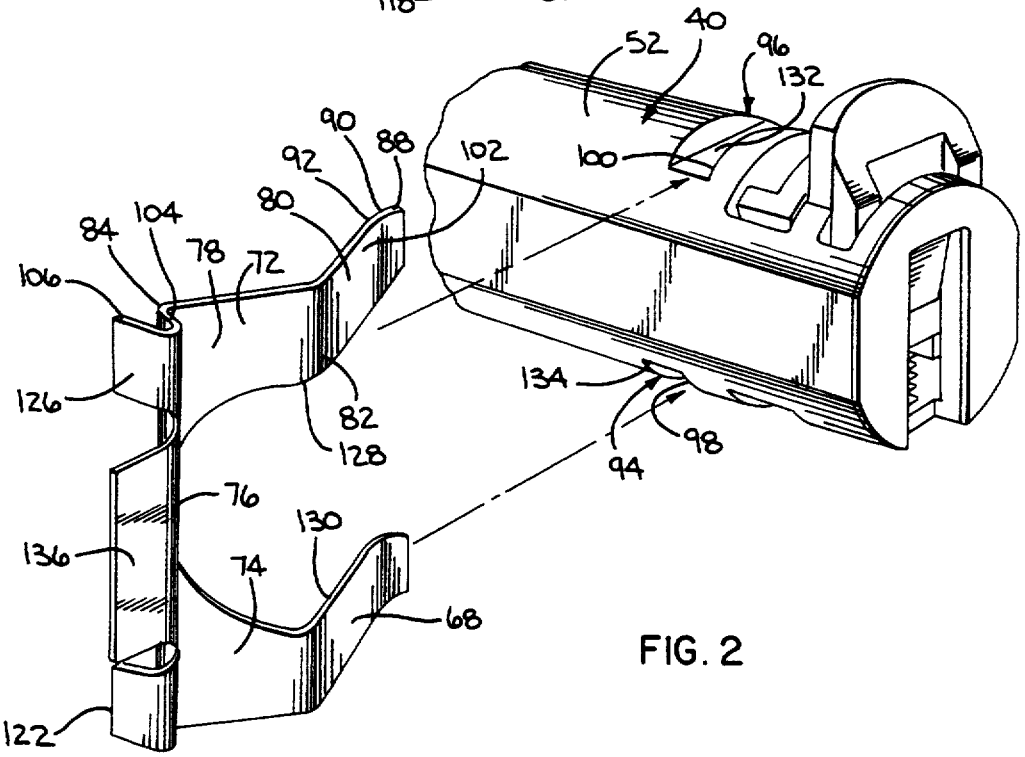
FIG. 2 is an exploded perspective view of the lock and retainer clip.
Figure 3:
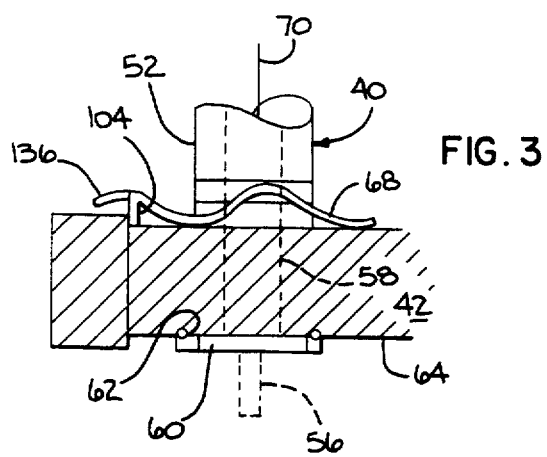
FIG. 3 is a schematic representation of a cross section of the closure member with the lock mounted thereon in an operative position according to the present invention.

The plunger 44 is movable between the latched position, shown in FIG. 1, and an unlatched position, wherein the plunger 44 is moved downwardly from the FIG. 1 position, as shown by the arrow 50, relative to an escutcheon assembly 52 in which the plunger 44 is mounted. The escutcheon assembly 52 has a generally cylindrical body 54 which extends fully through the closure assembly 42 and provides a foundation for the lock elements.

The plunger 44 is operable by a key 56 from externally of the closure member. The key 56 fits within a conventional-type cylinder 58 which is rotated within the escutcheon assembly 52 to manipulate the plunger 44. Since the details of the cylinder are well known to those in the art, a detailed description hereof is omitted.

The escutcheon assembly 52 has an enlarged, annular flange 60 defining a shoulder 62 that abuts to the outer surface 64 of the closure 42 to thereby arrest inward movement of the lock 40 with the escutcheon assembly in its operative position.

The principal focus of the present invention is on the structure for maintaining the escutcheon assembly 52 in its operative position. To accomplish this, a retainer clip 68 is provided. The retainer clip 68 is designed to be press fit into assembled relationship with the escutcheon assembly 52 and so as to exert an inward bias on the escutcheon assembly 52, thereby beating the annular shoulder 62 on the flange 60 positively against the outside surface 64 of the closure member 42. At the same time, as explained more fully below, the retainer clip 68 cooperates with the closure member 42 to prevent rotation of the escutcheon assembly 52 about its central axis 70.

More particularly, the retainer clip 68 is formed preferably as one piece. The retainer clip 68 can be formed from plastic, but is more preferably bent from a single blank of sheet metal stock. The retainer clip 68 has an overall U-shaped configuration with first and second spaced, biasing legs 72, 74 connected by a base 76 and opening in one direction i.e. left to right in FIG. 2. Each of the legs 72, 74 has the same construction, and thus the description herein will be limited to the exemplary first leg 72.

The first leg 72 is V-shaped with first and second angled parts 78, 80 meeting at an apex 82 and opening in a first direction. The first part 78 of the leg 72 terminates at a corner 84 defining a shoulder to bear against the inside surface 86 of the closure member 42. The second part 80 has an offset end 88 defining a shoulder 90 for also bearing against the inside surface 86 of the closure member 42. The end 88 may be bent as shown in solid lines or phantom lines in FIG. 4. In the event that the offset end 88 is as shown in solid lines, the shoulder 90 is defined by the entire outwardly facing surface of the offset 88. If the offset 88 is as shown in phantom lines, the corner 92 serves as a shoulder to abut the inside surface 86 of the closure member 42.

To accommodate the legs 72, 74, the escutcheon assembly 52 is undercut at diametrically opposite locations 94, 96 to define outwardly facing shoulders 98, 100, respectively. The escutcheon assembly 52 is undercut at 94, 96 sufficiently to allow the legs 72, 74 to pass therethrough and closely straddle the escutcheon assembly 52 with the retainer clip 68 in assembled relationship to the escutcheon assembly 52.

To effect assembly of the lock 40, the lock 40 is initially directed through the closure member 42 until the shoulder 62 thereon abuts the outside surface 64 of the closure member 42. This exposes the undercuts 94, 96 inside of the closure member 42. The free ends of the legs 72, 74 are then passed through the undercuts 94, 96 by translation of the retainer clip 68 from left to right in FIG. 2. As this occurs, the shoulder 90 is slid guidingly along the closure surface 86. The undercuts 94, 96 are situated axially on the escutcheon assembly 52 so that the inclined surface 102 on the leg 72 progressively cams the shoulder 100 inwardly to thereby draw the shoulder 62 positively against the outside surface 64 of the closure member 42. As the apex 82 moves into the center of the undercut 96, the corner 84 and shoulder 90 simultaneously bear on the inside surface 86. The pressure exerted by the shoulder 100 on the apex 82 causes a slight compression of the leg 72 which thus maintains a residual inward force on the escutcheon assembly 52.

The retainer clip 68 cooperates with the escutcheon assembly 52 and closure member 42 in a manner so as not only to maintain the escutcheon assembly 52 in its operative position but also to prevent rotation thereof about its lengthwise axis 70. To accomplish this, the base 76 of the retainer clip 68 is bent to define a third leg 104 projecting transversely to the first leg part 78. The third leg is reverse bent to define a fourth leg 106, with the third and fourth legs cooperatively defining a "U" shape opening outwardly of the closure 42.

The above described configuration is designed preferably to mount the lock 40 at a corner of the closure 42. More particularly, the closure 42 is typically bounded by an aluminum, extruded frame 108 which projects slightly inwardly from the surface 86. An inside corner 110 is defined at the juncture of horizontal and vertical frame members 112, 114, respectively. The horizontal frame member 112 defines a downwardly facing surface 116, while the vertical frame member 114 defines a laterally facing surface 118 substantially at right angles to the surface 116.

The retainer clip 68 is dimensioned so that in its assembled relationship the upper edge 120 of the first leg 72 confronts the downwardly facing surface 116 on the horizontal frame member 112. As the retainer clip 68 moves from left to right in FIGS. 1 and 2 towards its assembled position, the free edge 122 of the leg 106 slides along the inwardly facing surface 124 of the vertical frame member 114. As the retainer clip 68 approaches the fully assembled position therefor, the leg 106 is biased inwardly as it moves over the surface 124. Upon the fully assembled position being realized, the leg 106 springs forwardly to place the laterally facing surface 126 on the wall 106 in confronting relationship to the frame surface 118.

With the above arrangement, the inside edge 128 of the first leg 72 and inside edge 130 of the second leg 74 engage the radially outwardly facing undercut surfaces 132, 134, respectively, over a sufficient extent that the escutcheon assembly 52 cannot rotate relative to the retainer clip 68. In turn, any torque applied to the lock 40 in use is resisted by the abutment of the edge 120 on the retainer clip leg 72 to the frame surface 116 as well as the abutment of the wall surface 126 on the retainer clip 68 to the frame surface 118. Thus, the contact between the retainer clip and closure member 42 occurs at spaced locations to at all times resist rotation of the lock 40 relative to the closure 42.

Figure 4:
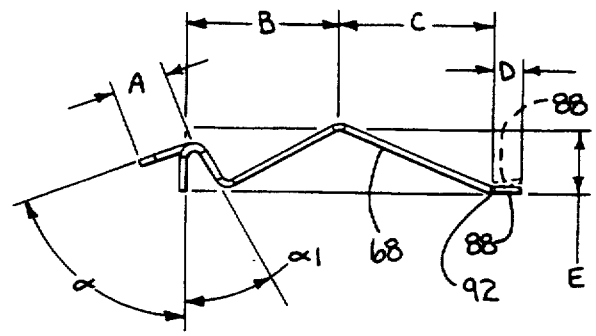
FIG. 4 is a plan view of the inventive retainer clip.
Figure 5:
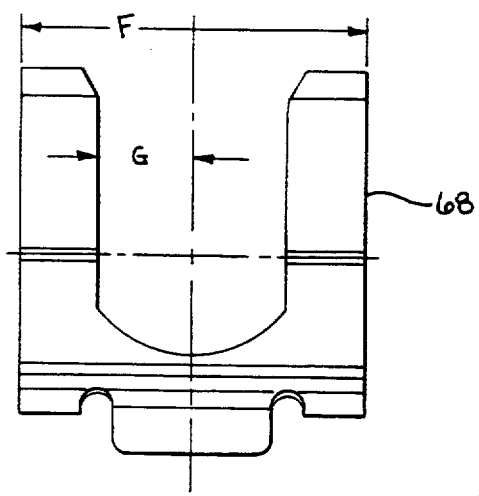
FIG. 5 is rear elevation view of the inventive retainer clip.

Exemplary dimensions for the retainer clip 68 are indicated below, as shown in FIGS. 4 and 5.

A = 0.215 inches

B = 0.607 inches

C = 0.630 inches

D = 0.113 inches

E = 0.249 inches

F = 1.386 inches

G = 0.374 inches $\alpha = 70°$ $\alpha 1 = 30°$

With the inventive structure, the lock 40 can be simply pressed from the outside of the closure 42 into an operative position whereupon the retainer clip 68 can be press fit into its assembled relationship. The retainer clip 68 can be disassembled by reversing the assembly step. The retainer clip 68 has a universal configuration for fight- or left-handed use.

To facilitate disassembly of the retainer clip 68, a tab 136 can be bent out of the wall 106. The user can pry the tab 136 to move the leg 104 inwardly sufficiently to allow lateral shifting of the retainer clip 68.

The foregoing disclosure of specific embodiments is intended to be illustrative of the broad concepts comprehended by the invention.

I claim:
1. In combination:
a) a lock unit comprising:
   an escutcheon assembly to be mounted on a movable closure member; and
   a retainer clip to maintain the escutcheon assembly in an operative position on a movable closure member,
   said escutcheon assembly defining a first shoulder and an axis,
   said retainer clip having a biasing portion defining a second shoulder for bearing on the escutcheon assembly first shoulder and a third shoulder for bearing on a surface of a movable closure member on which the escutcheon assembly is mounted with the escutcheon assembly in its operative position and the retainer clip and escutcheon assembly in assembled relationship,
   said biasing portion being in compression between the second and third shoulders to positively maintain the escutcheon assembly in its operative position on a closure member,
   wherein the retainer clip has a base and first and second legs that project away from the base and define a U-shape with the base opening in one direction.
   said first and second legs straddling the escutcheon assembly with the retainer clip and escutcheon assembly in assembled relationship,
   wherein at least one of the retainer clip legs is V-shaped opening in a first direction and the base of the retainer clip has a U-shaped portion opening in the first direction,
   said U-shaped portion defined by third and fourth legs with the third leg connecting to one of the first and second legs and the fourth leg defining a surface facing in a direction different from the one direction and a free edge facing in the first direction; and
b) a closure member to be mounted on a frame for movement between open and closed positions, there being means cooperating between the closure member, retainer clip and escutcheon assembly to allow the retainer clip to be removably pressed into assembled relationship with the escutcheon assembly with the escutcheon assembly in an operative position on the closure member such that the surface on the fourth leg abuts to the closure member to limit rotation of the retainer clip around the axis of the escutcheon assembly.

2. The combination according to claim 1 wherein the one leg has a V-shaped bend therein with an apex defining the second shoulder.

3. The combination according to claim 2 wherein the one leg has first and second parts extending away from the apex and defining the V-shape and one of the first and second parts defines the third shoulder.

4. The combination according to claim 1 wherein the surface on the fourth leg is substantially flat and resides in a plane substantially at right angles to the length of the first and second legs.

5. The combination according to claim 1 wherein the retainer clip is defined as a single piece.

6. The combination according to claim 1 wherein the retainer clip is formed from a single metal piece.

7. The combination according to claim 1 wherein there is a tab projecting in cantilever fashion at the base of the retainer clip to facilitate prying of the retainer clip out of its assembled relationship with the escutcheon assembly.

8. The combination according to claim 1 wherein with the retainer clip pressed against the escutcheon assembly in an assembly direction into its assembled relationship, the free edge on the fourth leg abuts to a surface of the closure member facing oppositely to the first direction.

* * * * *